United States Patent
Wildi et al.

(10) Patent No.: US 9,662,824 B2
(45) Date of Patent: May 30, 2017

(54) PROCESS FOR PRODUCING BIOPOLYMER NANOPARTICLES

(75) Inventors: Robert H. Wildi, Parkersburg, WV (US); Edward Van Egdom, Dunday (CA); Steven Bloembergen, Okemos, MI (US)

(73) Assignee: EcoSynthetix Ltd., Lansing, MI (US)

( * ) Notice: Subject to any disclaimer, the term of this patent is extended or adjusted under 35 U.S.C. 154(b) by 1285 days.

(21) Appl. No.: 12/377,501

(22) PCT Filed: Aug. 14, 2007

(86) PCT No.: PCT/US2007/075901
§ 371 (c)(1),
(2), (4) Date: Nov. 3, 2010

(87) PCT Pub. No.: WO2008/022127
PCT Pub. Date: Feb. 21, 2008

(65) Prior Publication Data
US 2011/0042841 A1    Feb. 24, 2011

Related U.S. Application Data

(60) Provisional application No. 60/837,669, filed on Aug. 15, 2006.

(51) Int. Cl.
*B29C 47/36* (2006.01)
*B29C 47/60* (2006.01)
(Continued)

(52) U.S. Cl.
CPC ........... *B29C 47/6056* (2013.01); *B29B 9/00* (2013.01); *B29B 9/06* (2013.01); *B29B 9/08* (2013.01);
(Continued)

(58) Field of Classification Search
USPC ......... 264/140–143, 211.21, 211.23, 211.24; 425/208; 366/82, 88
See application file for complete search history.

(56) References Cited

U.S. PATENT DOCUMENTS 3,985,348 A * 10/1976 Skidmore ...................... 366/75
4,117,549 A    9/1978 Antrim
(Continued)

FOREIGN PATENT DOCUMENTS

EP    1254939    11/2002
WO    0240579    5/2002

OTHER PUBLICATIONS

Extruder handbook by Giles et al, pp. 133-140, Dec. 31, 2004, 1st edition.*

(Continued)

*Primary Examiner* — Matthew Daniels
*Assistant Examiner* — Kimberly A Stewart (57) ABSTRACT

A process for producing a biopolymer nanoparticles product is disclosed. In this process, biopolymer feedstock and a plasticizer are fed to a feed zone of an extruder having a screw configuration in which the feedstock is process using shear forces in the extruder, and a crosslinking agent is added to the extruder downstream of the feed zone. The biopolymer feedstock and plasticizer are preferably added separately to the feed zone. The screw configuration may include two or more steam seal sections. Shear forces in a first section of the extruder may be greater than shear forces in an adjacent second section of the extruder downstream of the first section. In a post reaction section located after a point in which the crosslinking reaction has been completed, water may be added to improve die performance.

3 Claims, 3 Drawing Sheets

(51) Int. Cl.

| | | |
|---|---|---|
| *C08B 31/00* | (2006.01) | |
| *C08J 3/24* | (2006.01) | |
| *C08L 3/02* | (2006.01) | |
| *B29B 9/00* | (2006.01) | |
| *B29B 9/08* | (2006.01) | |
| *B29B 9/06* | (2006.01) | |
| *B29C 47/00* | (2006.01) | |
| *B29C 47/10* | (2006.01) | |
| *B29K 105/00* | (2006.01) | |
| *C08K 5/00* | (2006.01) | |
| *B29B 9/12* | (2006.01) | |

(52) U.S. Cl.
CPC .......... *B29C 47/0014* (2013.01); *B29C 47/60* (2013.01); *B29C 47/6031* (2013.01); *B29C 47/6037* (2013.01); *B29C 47/6062* (2013.01); *B29C 47/6087* (2013.01); *C08B 31/003* (2013.01); *C08J 3/24* (2013.01); *C08L 3/02* (2013.01); *B29B 2009/125* (2013.01); *B29C 47/0004* (2013.01); *B29C 47/1063* (2013.01); *B29C 47/1081* (2013.01); *B29K 2003/00* (2013.01); *B29K 2105/0005* (2013.01); *B29K 2105/0038* (2013.01); *C08J 2303/02* (2013.01); *C08K 5/0025* (2013.01)

(56) References Cited

U.S. PATENT DOCUMENTS

| | | | |
|---|---|---|---|
| 4,877,390 A | | 10/1989 | Ocker et al. |
| 4,902,455 A | | 2/1990 | Wobbe |
| 5,474,718 A | * | 12/1995 | Eastman ..................... 264/4.3 |
| 5,635,237 A | * | 6/1997 | Greenberg ............ A23K 40/20 |
| | | | 426/284 |
| 5,723,506 A | | 3/1998 | Glorioso et al. |
| 6,001,408 A | | 12/1999 | Dudacek et al. |
| 6,024,479 A | | 2/2000 | Haring |
| 6,042,260 A | | 3/2000 | Heidemeyer et al. |
| 6,242,266 B1 | | 6/2001 | Schleifer et al. |
| 6,261,081 B1 | | 7/2001 | Speck et al. |
| 6,302,572 B1 | | 10/2001 | Cox et al. |
| 6,383,544 B1 | | 5/2002 | Elkins |
| 6,677,386 B1 | * | 1/2004 | Giezen et al. ................. 516/31 |
| 6,825,252 B2 | | 11/2004 | Helbling et al. |
| 6,921,430 B2 | | 7/2005 | Bloembergen et al. |
| 7,160,420 B2 | | 1/2007 | Helbling et al. |
| 2002/0044968 A1 | * | 4/2002 | van Lengerich ............. 424/469 |
| 2002/0185769 A1 | | 12/2002 | Hasegawa et al. |
| 2003/0067089 A1 | * | 4/2003 | Wang et al. .................. 264/102 |
| 2003/0154859 A1 | | 8/2003 | Simonaru et al. |
| 2003/0216496 A1 | * | 11/2003 | Mohanty ................ B29C 67/24 |
| | | | 524/284 |
| 2004/0011487 A1 | | 1/2004 | Helbling et al. |
| 2004/0209977 A1 | * | 10/2004 | Hossan ......................... 523/324 |
| 2004/0241382 A1 | | 12/2004 | Bloembergen et al. |
| 2006/0006258 A1 | * | 1/2006 | Remon et al. .................. 241/21 |

OTHER PUBLICATIONS

PCT International Preliminary Report on Patentability, Application No. PCT/US2007/075901, Feb. 17, 2009.

IP Australia, Examiner's First Report, Application No. 2007285951, Mar. 10, 2011.

State Intellectual Property Office of the People'S Republic of China, Notice on the First Office Action, Application No. 200780030298.9, Nov. 12, 2010.

Applicant, Response to Chinese Patent Office First Office Action, Application No. 200780030298.9 [includes Email from Ainslie E.F. Little with comments and instructions to Chinese foreign associate for filing Response], May 26, 2011.

Republic of South Africa, Letters Patent, No. 2009/01007, May 26, 2010.

Wildi, R., et al., Understanding Compounding, Hanser/Gardner Publications, 1998, pp. 97-98.

State Intellectual Property Office of the People's Republic of China, Notice on the Second Office Action, Application No. 200780030298.9, Jun. 22, 2011.

Supplementary European Search Report of EP 07840927, Jun. 6, 2013.

* cited by examiner

PROCESS FOR PRODUCING BIOPOLYMER NANOPARTICLES

CROSS-REFERENCES TO RELATED APPLICATIONS

This application claims priority from U.S. Provisional Patent Application No. 60/837,669 filed Aug. 15, 2007.

STATEMENT REGARDING FEDERALLY SPONSORED RESEARCH

Not Applicable.

BACKGROUND OF THE INVENTION

1. Field of the Invention

This invention relates to a process for producing biopolymer nanoparticles and in particular, starch nanoparticles.

2. Description of the Related Art

U.S. Pat. No. 6,677,386 (which corresponds to WO 00/69916) describes a process for producing biopolymer nanoparticles, which in one form are starch nanoparticles. In the process, the biopolymer is plasticized using shear forces, and a crosslinking agent is added during the processing. After the processing, the biopolymer nanoparticles can be dispersed in an aqueous medium. One version of the process results in starch nanoparticles which are characterized by an average particle size of less than 400 nanometers.

U.S. Pat. No. 6,677,386 notes that the nanoparticles can be used as a matrix material wherein the matrix material may be a film-forming material, a thickener, or a rheology modifier, or an adhesive or an adhesive additive (tackifier). The nanoparticles or dispersions thereof may also be used for their barrier properties, as a carrier, as a fat replacer, or as a medicament for mitigating dermal disorders. Further examples of applications for the nanoparticles or dispersions thereof are in the paper-making and packaging industry, or in agriculture and horticulture. The nanoparticles can also be used as excipients or carriers in medicines, where they may be complexed or covalently coupled to active substances such as slow-release drugs. The nanoparticles can also be processed into a foam at relatively high density.

Other uses of the nanoparticles of U.S. Pat. No. 6,677,386 can be found in: (i) U.S. Patent Application Publication No. 2004/0011487 which describes the use of the starches as a wet-end additive in papermaking pulp slurry, or applied to the surface of the paper as a surface sizing agent; (ii) U.S. Pat. No. 6,825,252 which describes the use of the starches in a binder in a pigmented paper coating composition; (iii) U.S. Pat. No. 6,921,430 which describes the use of the starches in environmentally friendly adhesives; and (iv) U.S. Patent Application Publication No. 2004/0241382 which describes the use of the starches in an adhesive for producing corrugated board. The disclosure of these patents and applications, and of all other publications referred to herein, are incorporated by reference as if fully set forth herein.

It can be seen that the nanoparticles prepared by the process of U.S. Pat. No. 6,677,386 have numerous uses. Furthermore, additional uses will likely be found in the future. As a result, the demand for larger quantities of the biopolymer nanoparticles will continue to increase. However, there are concerns that the process described in U.S. Pat. No. 6,677,386 may not be able to keep up with the increasing demand for the biopolymer nanoparticles.

Therefore, there is a need for an improved process for producing larger quantities of biopolymer nanoparticles and in particular, starch nanoparticles.

SUMMARY OF THE INVENTION

The foregoing need for an improved process for producing a biopolymer nanoparticles product is met by the present invention. In the process, biopolymer feedstock and a plasticizer are fed to a feed zone of an extruder having a screw configuration such that the biopolymer feedstock is processed using shear forces in the extruder, and a crosslinking agent is added to the extruder downstream of the feed zone. An extrudate is foamed through an extrusion die.

In one aspect of the invention, the biopolymer feedstock and the plasticizer are added separately to the feed zone. In another aspect of the invention, the extruder has single flight elements in the feed zone. In still another aspect of the invention, the extruder has an upstream section, a downstream section, and an intermediate section between the upstream section and the downstream section, and the temperatures in the intermediate section are kept above 100° C.

In yet another aspect of the invention, the screw configuration includes two or more steam seal sections wherein each steam seal section has an upstream pressure generating section and an adjacent downstream mixing section. Each upstream pressure generating section has a forward conveying flight, and each downstream mixing section has a reverse flight. In still another aspect of the invention, shear forces in a first section of the extruder are greater than shear forces in an adjacent second section of the extruder downstream of the first section, and the crosslinking agent is added to the second section of the extruder. In yet another aspect of the invention, shear forces in a first section of the extruder are greater than shear forces in a post reaction section of the extruder downstream of the first section wherein the post reaction section is located in a position in which a crosslinking reaction has been completed, and wherein water is added in the post reaction section.

The biopolymer feedstock may be starch. Non-limiting examples of the starch include potato starch, wheat starch, tapioca starch, cassava starch, rice starch, corn starch, waxy corn starch, and any other starches. In one example, the nanoparticles are formed from a high amylopectin based starch (>95% amylopectin, <5% amylose).

The plasticizer may be selected from the group consisting of water, alcohols, and mixtures thereof. The plasticizer may be selected from the group consisting of water, polyols, and mixtures thereof.

The crosslinking agent may be selected from dialdehydes and polyaldehydes, acid anhydrides and mixed anhydrides (e.g. succinic and acetic anhydride) and the like. Suitable dialdehydes and polyaldehydes are glutaraldehyde, glyoxal, periodate-oxidized carbohydrates, and the like. The crosslinking agent may also be selected from conventional crosslinkers such as epichlorohydrin and other epoxides, triphosphates, and divinyl sulphone. The crosslinking reaction may be acid-catalyzed or base-catalyzed.

A process according to the invention may achieve complete or near complete gelatinization of the biopolymer feedstock. Advantageously, the process achieves removal of virtually all of any native biopolymer (e.g. starch) crystalline structure before the crosslinking reaction such that the crystalline structure is not detectable using standard techniques (e.g. cross-polarization microscopy). A process according to the invention meets the challenge of removing native biopolymer (e.g. starch) crystalline structure at higher production rates such as 1 metric ton per hour.

A process according to the invention also increases control over the viscosity of a colloidal dispersion of the nanoparticles. The biopolymer nanoparticles form a polymer colloid upon dispersion in water, and the extrusion conditions of the present invention have an effect on the viscosity of these colloidal dispersions.

Polymer colloids are impressive in terms of their ability to form high solids dispersions in water of a relatively high molecular weight polymer, typically from 40 to 65% solids (the theoretical maximum being 72%, which has in fact been achieved for special emulsions with broad particle size distributions). Yet these dispersions still have a moderately low viscosity (e.g. 500-2500 cps; note that cps=mPa·s). The same polymer dissolved in a solvent would typically have a very high viscosity at 10-15% solids (upwards from 5000 cps).

Whereas the viscosity of a polymer in solution is directly proportional to the molecular weight of that polymer, the viscosity of colloidal emulsions is not. It is independent of molecular weight, and determined largely by the number of particles, the size of the particles, and the distribution of particle size.

The relationship between extrusion conditions of the present invention and the colloidal dispersion viscosity of the biopolymer (e.g. starch) nanoparticles is not intuitive. The cross-linked nanoparticles produced by the extrusion process of the invention contain a small fraction (<~1%) of uncrosslinked biopolymer (e.g. starch) that acts as a steric stabilizer for the nanoparticles. Such a steric stabilizer is commonly known as "protective colloid", to those skilled in the art. The biopolymer (e.g. starch) polymer fragments that serve as the protective colloid for the biopolymer (e.g. starch) nanoparticle dispersions are formed as a results of the reactive extrusion process, and are responsible for the advantageous shear-thinning rheological properties of the aqueous nanoparticle dispersions as well as the unexpected and extremely high shear stability observed for this system. The shear rate in the nip of a corrugating roll is about 20,000 $s^{-1}$ (very high shear), while it is several million $s^{-1}$ (extremely high shear) in high speed paper coating applications. Starch nanoparticle dispersions produced according to the invention are therefore very well suited as high solids colloids in corrugating and paper coating applications.

While different extrusion conditions lead to differing viscosities, they all contain similar sized cross-linked nanoparticles that have high molecular weight (due to the cross-links), but in addition contain the protective colloid that can have lower or higher molecular weight depending on the aggressiveness of the extrusion conditions. A process according to the invention can manipulate the molecular weight of the protective colloid formed in-situ with the starch nanoparticles.

These and other features, aspects, and advantages of the present invention will become better understood upon consideration of the following detailed description, drawings and appended claims.

DETAILED DESCRIPTION OF THE INVENTION

Figure 1:
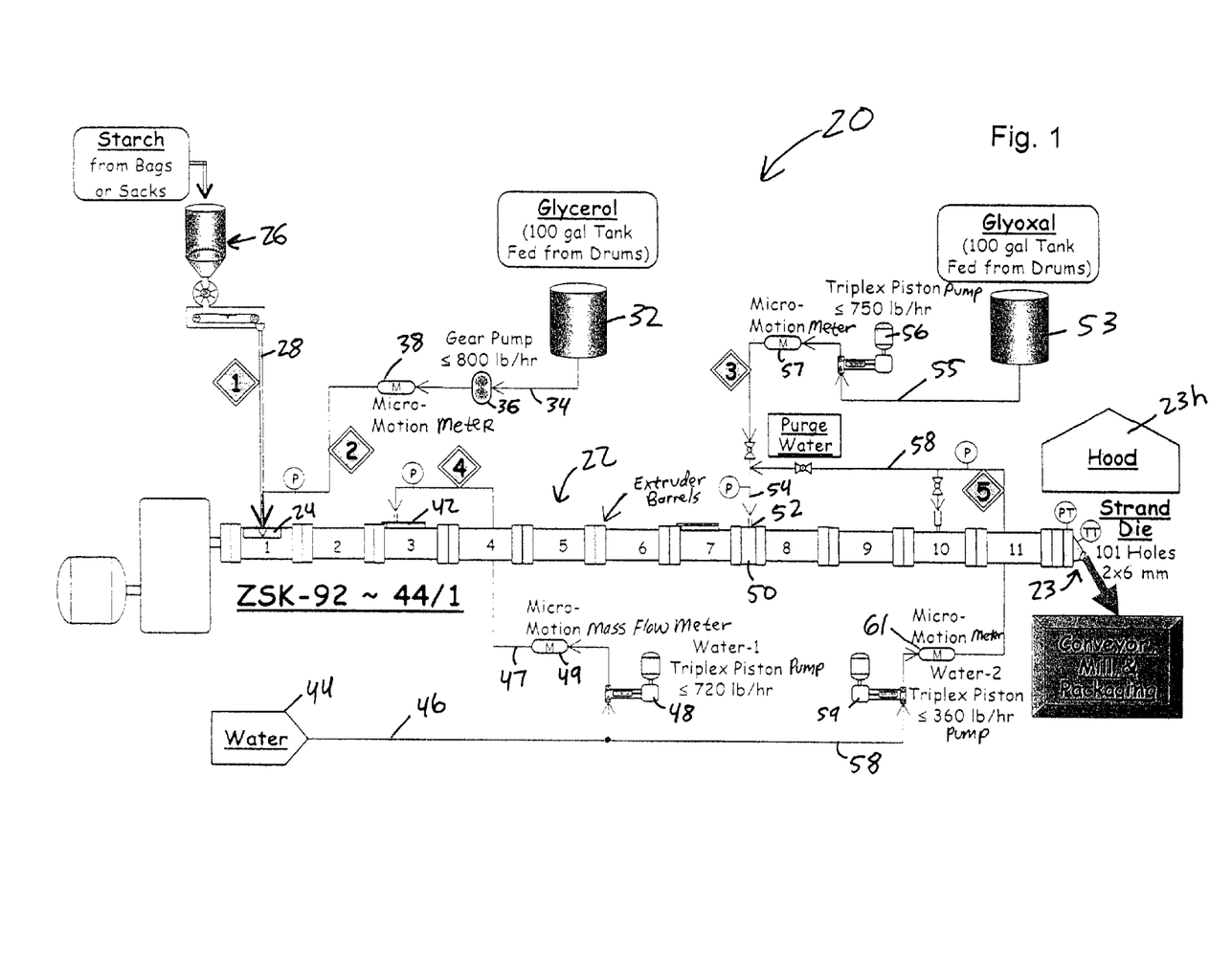
FIG. 1 is a schematic of an example apparatus suitable for use in the process of the invention.

FIG. 1 shows an apparatus 20 suitable for use in the process of the invention. The apparatus 20 can be used to produce the biopolymer nanoparticles of U.S. Pat. No. 6,677,386. The apparatus 20 includes a twin screw extruder 22 having eleven extruder barrels 1 to 11 with end flanges by which the barrels 1 to 11 are detachably joined to each other to create two overlapping bores for receiving the two extruder screws. The apparatus 20 also includes an extruder die 23 with an associated exhaust hood 23h.

Barrel 1 has an inlet 24 for receiving a biopolymer (starch in FIG. 1) and plasticizer (glycerol in FIG. 1). The inlet 24 receives dry starch from a feed hopper 26 by way of a feed conduit 28. The inlet 24 receives glycerol from a plasticizer tank 32 by way of a feed conduit 34 that includes a feed pump 36 and a Micro-Motion brand mass flow meter 38. Other non-limiting examples of biopolymers that can be processed in the apparatus 20 include other polysaccharides such as cellulose and gums, as well as proteins (e.g. gelatin, whey protein). The biopolymers may be previously modified, e.g. with cationic groups, carboxy-methyl groups, by acylation, phosphorylation, hydroxyalkylation, oxidation and the like. Other non-limiting examples of plasticizers that can be used in the apparatus 20 include water and in addition to glycerol other polyols such as ethyleneglycol, propyleneglycol, polyglycols, sugar alcohols, urea, citric acid esters, etc.

Barrel 3 has an inlet 42 for receiving water. The inlet 42 receives water from a water source 44 by way of a feed conduit 46 and a feed conduit 47 which includes a feed pump 48 and a Micro-Motion brand mass flow meter 49.

A linking barrel 50 between barrels 7 and 8 has an inlet 52 for receiving a crosslinker (glyoxal in FIG. 1) and purge water. Inlet 52 receives glyoxal from a crosslinker tank 53 by way of a feed conduit 54 and a feed conduit 55 that includes a feed pump 56 and a Micro-Motion brand mass flow meter 57. Inlet 52 receives purge water from water source 44 by way of feed conduit 46 and a feed conduit 58 that includes a feed pump 59 and a Micro-Motion brand mass flow meter 61. Barrel 10 may also receive water from feed conduit 58. Other non-limiting examples of cross-linkers that can be used in the apparatus 20 include dialdehydes and polyaldehydes, acid anhydrides and mixed anhydrides (e.g. succinic and acetic anhydride), periodate-oxidized carbohydrates, and the like. Suitable dialdehydes are glutaraldehyde and glyoxal. The crosslinking agent may also be selected from conventional crosslinkers such as epichlorohydrin and other epoxides, triphosphates, and divinyl sulphone. The crosslinking reaction may be acid-catalyzed or base-catalyzed.

Figure 2:
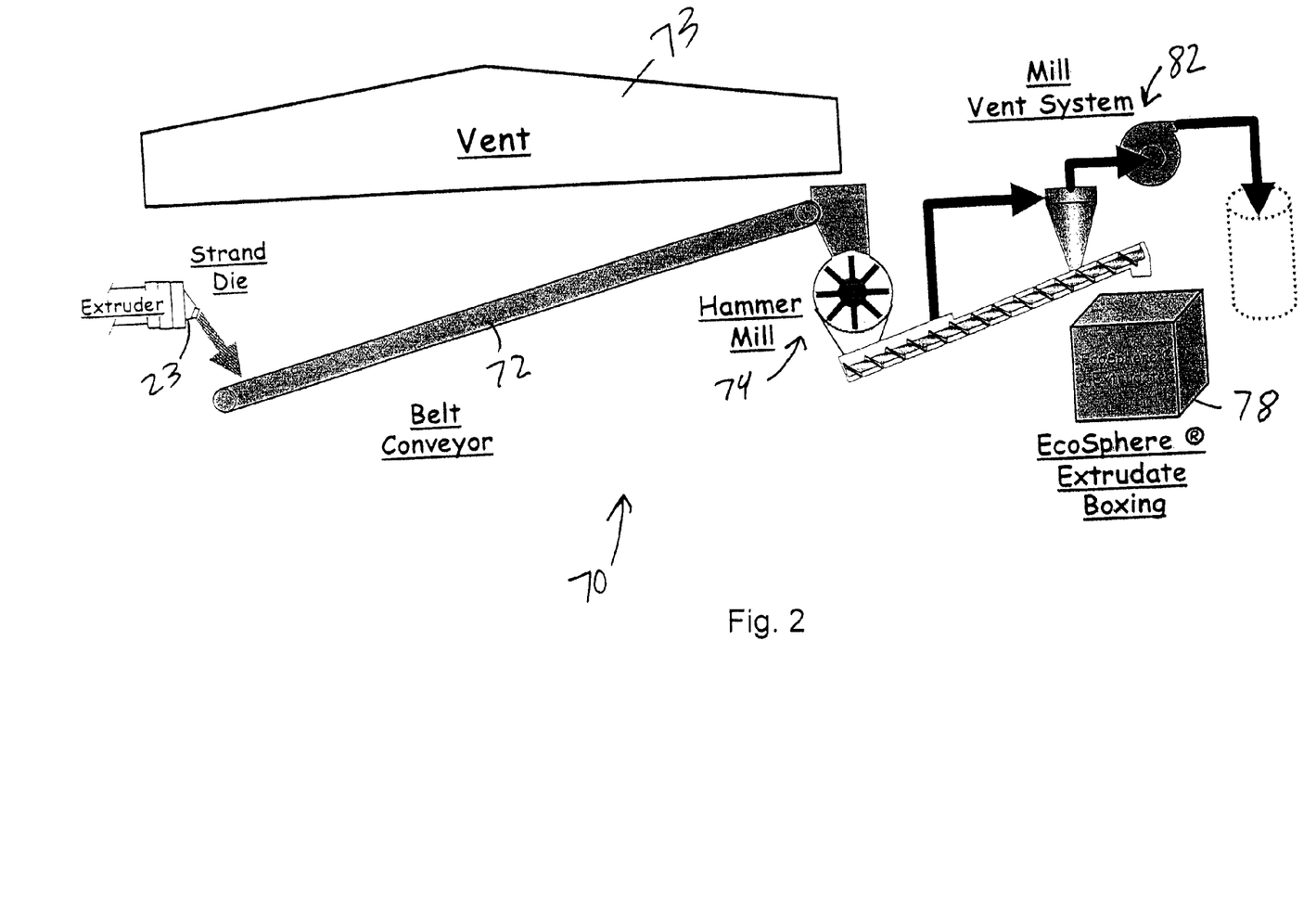
FIG. 2 is a schematic of a packaging system suitable for use in the process of the invention.

Referring now to FIG. 2, there is shown a packaging system 70 of the apparatus 20. The packaging system 70 includes a belt conveyer 72 that receives extrudate from the extruder die 23. An appropriate conveyer vent system 73 is also provided. The belt conveyer 72 transfers extrudate to a hammer mill 74 for milling the extrudate into smaller sized particles. The milled extrudate is then packaged in boxes 78 (or bags or supersacks or bulk trucks or railcars as may be required). An appropriate mill vent system 82 is also provided to capture fine particulate matter from the hammer mill 74. As an alternative to the strand and belt conveyor, a dry hot face cutter and pneumatic conveyor have been used to cool and convey the product to a mill.

The present invention provides a process that has a unique sequence of unit operations and a unique process control scheme which permits the manufacture of the biopolymer nanoparticles of U.S. Pat. No. 6,677,386 at production rates of greater than or equal to 1.0 metric tons per hour of dry product on a modified ZSK-92 Mega compounder. (A ZSK-92 Mega co-rotating twin screw compounder is available from Coperion Werner & Pfleiderer GmbH & Co., Stuttgart, Germany.) Based on volumetric scale up, rates of 3 metric tons/hour are anticipated on a ZSK-133 at 500 rpm. Nevertheless, similar results can be obtained on other brands and models of extruders by designing their screw configurations.

It is the combination of unit operations used in a process according to the invention that provides advantages over prior processes. In Examples 1 through 10 of U.S. Pat. No. 6,677,386, feed rates were 8.4 to 8.8 kg/hr of premix including starch, water and glycerol. This compares with a normal production rate of 110 to 160 kg/hr for a commercially available extruder sold under the designation Berstorff ZE-40 (which was used in the examples of U.S. Pat. No. 6,677,386). Steam back venting was not a problem in the examples of U.S. Pat. No. 6,677,386 because of the low temperatures and relatively high area to volume which are both as a result of the scale of the examples of U.S. Pat. No. 6,677,386.

With geometrically similar machines, the surface area scales are based on the diameter squared and the process volume based on the diameter cubed. This means that as the process is scaled up the area to volume ratio decreases proportionally to the diameter; and that the process must be operable independent of the barrel temperatures. In addition to the relative scale, the Berstorff ZE-40 extruder has a low volume for its size as a result of a shallow screw configuration. Relative machine volume is compared by the ratio of the screw diameter to the root diameter or outside diameter/inside diameter (OD/ID). On the Berstorff ZE-40 extruder, the OD/ID ratio is only 1.24:1. Most current production machines have an OD/ID ratio of 1.46:1 and higher. The ZSK-58, -92, and -133 compounder has a volume ratio of 1.55:1. This is important because of the floodability of starch resulting in a relatively low effective bulk density. In order to achieve viable production rates, higher volume extruders are desirable. For example, a ZSK-133 compounder can increase the rate up to the 3 metric tons per hour range.

A. Feeding

Starch is a fine powder which is prone to flooding at high screw speeds and specific rates (kg/hr/rpm or mass of product per hour at given rpm). Given the cost competitive nature of the industry, viable rates for the production of the nanoparticles are believed to be at least 1 metric ton per hour. In the examples of U.S. Pat. No. 6,677,386, premixing or preconditioning the starch was used, which made the starch easier to feed and reduced its tendency to flood the extruder. It is desirable to eliminate premixing as a process operation and to feed the ingredients directly to the extruder (as in feed conduits 28 and 34 of the apparatus 20 of FIG. 1).

Higher volume 2D undercut elements have been used to maximize the solids conveying capacity. It has been discovered that by using the single flight (SF) elements (see Robert H. Wildi and Christian Maier, "Understanding Compounding", Hanser Gardner Publications, 1998, pages 97-98), and by injecting either water or glycerol (plasticizer) into the feed inlet 24, much higher rates can be achieved than with the undercut elements.

Some advantageous process details in the extruder feed zone include, without limitation: (i) the feeding of neat starch, (ii) the feeding of glycerol and/or water to the center of the feed inlet opening to help solids conveying and achieve a similar effect as preconditioning the starch, and (iii) the use of single flight elements which is good for floodable powders and minimizes steam back-venting that causes the feed zone to plug.

B. Steam Seal

The process must be run with high temperatures in order to achieve complete gelatinization of the starch at viable production rates where the retention time is on the order of 10 seconds or less. High temperatures are also used to control the viscosity of the biopolymer nanoparticles product when dispersed in water. These temperatures are above the boiling point of water at atmospheric pressure; therefore, pressure must be maintained in the extruder 22 to keep the water from flashing to steam. Because the steam is a separate phase, it can readily flow backwards towards the feed inlet 24. Once in the feed system, it will condense and wet the starch, causing flow blockages due to partially cooked starch paste in a gravity flow environment.

Figure 3:
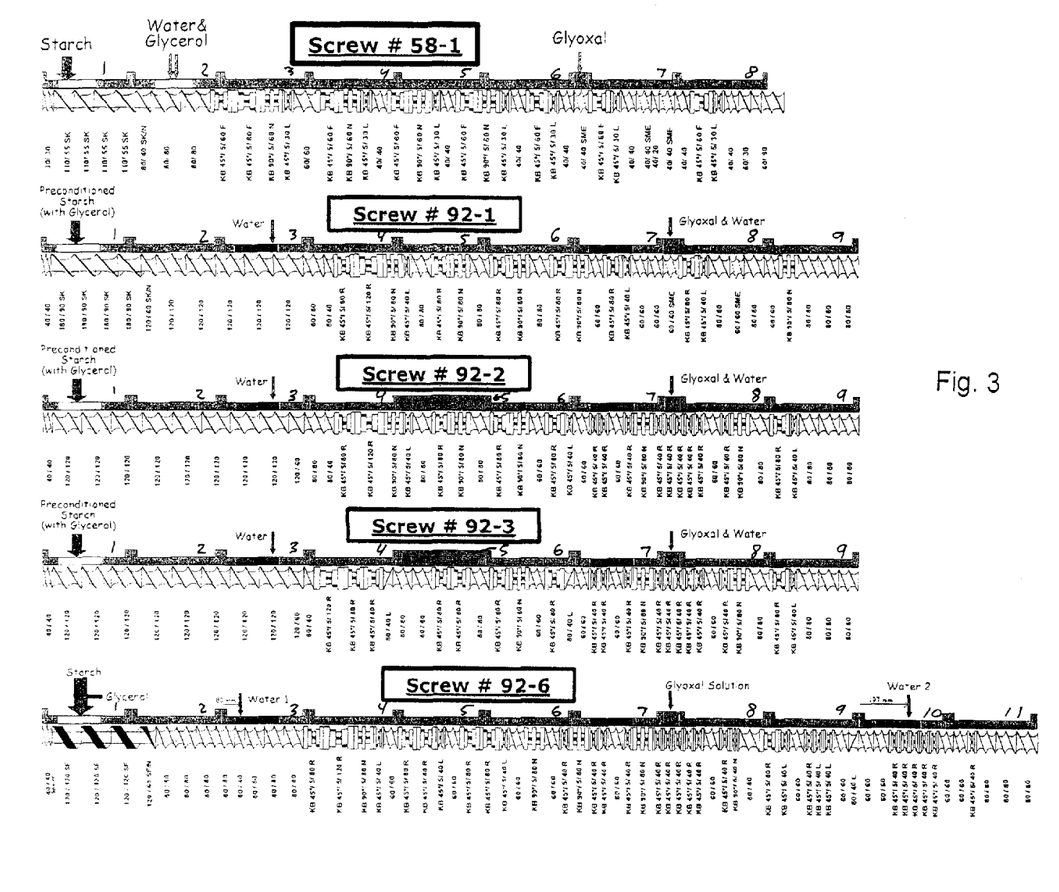
FIG. 3 shows various screw configurations used in the Examples below that serve to illustrate the invention.

It has been discovered that a steam seal must be formed with a series of relatively moderate restrictions as in the screw design depicted in Screw #92-6 of FIG. 3. (One of the two screws is shown for illustration throughout FIG. 3 as is normal in the industry.) Screw #92-1 of FIG. 3 had steam back-venting in about 45 minutes and Screw #92-3 of FIG. 3 with a strong restriction was operable for less than 15 minutes. It is necessary to balance these restrictions so that the pressure building capability of the screw is greater than the rise in the vapor pressure of the water due to increasing temperature. Screw #92-1 of FIG. 3 used relative mild restrictions: neutral kneading blocks, while that in Screw #92-3 of FIG. 3 used a very strong restriction: a reverse conveying element. With the successful Screw #92-6 of FIG. 3, a balance was achieved by using a series of moderate restrictions, each proceeded by enough pumping and mixing to fill the flights and overcome the restriction.

When the temperatures in the process exceed 100° C., steam seals are necessary to prevent water from flashing to steam and back venting to the feed opening. This is done by gradually increasing the pressure in the extruder faster than the vapor pressure of water increases due to the increasing temperature used to cook and break down the starch for viscosity control. For example, at 200° C., the absolute vapor pressure of pure water is 1.57 megapascals (i.e. 1.47 megapascals gauge or 213 psig). Seals are formed by using a restriction which must be overcome by a forward pumping action. Seals are influenced by the flight fillage in the extruder with higher specific rates normally resulting in a more robust seal to a point where the flights become too full for pressure generation.

It has been found that if a series of moderate seals are used, the pressure in the extruder can be increased gradually. The effect of progressive seals are cumulative. If too strong of a seal is used such that the energy and resultant temperature/pressure increase necessary to overcome it is greater than the pressure in the extruder before it, steam will form and back vent. The seals are formed by a combination of a restriction proceeded by enough forwarding elements to more than overcome it. In the successful example, three Left Hand (reverse) Kneading Blocks (LKB) are used to generate the steam seal. When pressure is being generated, the flights or kneading blocks will be full. It is important that the forward pumping is sufficient to overcome the steam pressure increase due to temperature increases in each mixing section. Each mixing section is proceeded by conveying to insure that there is adequate pressure generation. By using a series of such mixing and pressure generation sections, the starch can be heated to increase the rate of gelatinization and to control the product viscosity without steam back venting. It is preferred that this be done with mixing sections such as kneading blocks to keep the starch well mixed and eliminate small regions of un-wetted starch that are akin to making gravy with lumps in it. If these are allowed to form, they will not become gelatinized nor subsequently react with the crosslinker and will adversely affect the dispersion viscosity and long term stability of aqueous dispersions of the product.

The design of the first mixing section/seal is very crucial because significant pressure cannot be generated in the solids conveying preceding it. It must be strong enough to initiate the gelatinization (i.e., transition from solid to thermoplastic melt) of the feedstock without generating excessive steam pressure. This can be done with traditional forward and reverse KB combinations or with the Eccentric tri-lobe kneading blocks.

Some advantageous process details regarding the steam seal include, without limitation: (i) the use of progressive seals to eliminate steam back-venting because one strong restriction causes back venting; (ii) the building of pressure faster than the vapor pressure of water to stop back venting; and (iii) the ability to go to higher production rates.

C. Gelatinization

It has been demonstrated that complete gelatinization of the starch is necessary for the viscosity stability of aqueous dispersions of the biopolymer nanoparticles product. Residual ungelatinized starch including "ghosts" (fragments of starch granules and partially gelatinized starch) will cause a dispersion to gel overnight or in a matter of days on the shelf. The degree of gelatinization can be analyzed with cross-polarization microscopy. At high rates typical of modern extrusion operations, this is very difficult because of the relatively short residence time in the initial mixing zone prior to the crosslinking reaction zone.

It has been discovered that by using a relatively strong, high shear initial mixing section with minimal back-flow, complete gelatinization can be achieved at high rates. After this high shear section, a series of lower shear mixing sections are used to provide mixing, further heating, and residence time for the "cooking" of the starch. As discussed above, these are also designed to form a steam seal.

Some advantageous process details to achieve near complete gelatinization include, without limitation: (i) water injection at the feed inlet to plasticize the starch and control product viscosity, (ii) the use of a strong initial kneading zone to avoid residual ungelatinized starch including "ghosts", and (iii) the use of progressive seals to eliminate steam back-venting.

D. Reaction

The crosslinking reactant (e.g. glyoxal) is injected to the extruder 22 in a moderate to low shear mixing zone designed to provide good distributive mixing of the low viscosity liquid into the extremely high viscosity starch paste. This is done to eliminate pooling of the crosslinking reactant as a separate phase and to achieve distribution in the starch paste as quickly as possible for a consistent reaction. Although this is extreme in extruders, this is somewhat analogous to adding water to a bread dough, or adding milk to a very thick pancake batter. After the initial mixing, a series of conveying and mixing sections are used to allow time and mixing for completion of the reaction.

It has been discovered that the crosslinking reactant of the process of U.S. Pat. No. 6,677,386 should be added after the very high shear zones used for gelatinization of the starch.

Some advantageous process details to achieve homogeneous reaction include, without limitation: (i) glyoxal injection over mixing elements to eliminate "pooling", and (ii) the use of staged mixing zones with mild mixing after glyoxal injection, i.e., dividing and combining, not shearing, with good retention time.

E. Post Reaction Conditioning

It has been found that because of the relatively high temperatures of the melt phase in the extrusion process (up to 210° C.) used to control the final product viscosity when dispersed in water, steam blowing out the extruder die 23 can be a significant problem affecting both the operability of the process and consistency of the product quality. Without the proper process, pressure and temperature in the extruder build up until it overcomes the die restriction and then literally empties the end of extruder in a surge or blow out. This flashing cools the end of the extruder; and as a result has an effect on the product dispersion viscosity. The net result is a cycle in the viscosity of the instantaneous discharge and the final product becomes a blend of a variable production.

This problem is overcome by the addition of a very strong seal at the end of the reaction zone to achieve a controlled throttle of the steam pressure followed by a post reaction conditioning zone where additional water can be added to the product to control the behavior of the extrudate and the bulk properties of the product without uncontrolled affects on the dispersion viscosity. The strong seal eliminates cooling in the reaction zone. As with the crosslinker (e.g., glyoxal), the post reaction water is injected to the extruder 22 in a moderate to low shear mixing zone designed to provide good distributive mixing of the low viscosity liquid into the very high viscosity paste.

The post reaction zone is also used to generate the pressure necessary to pump the product through the die 23.

Some advantageous process details in the post reaction zone include, without limitation: (i) the use of a strong seal to control flashing and eliminate cooling in the reaction zone, (ii) the use of water injection over mixing elements to eliminate pooling, (iii) the use of water injection to control conveyor handling and to control bulk properties of the product, and (iv) the application of sufficient pressure to overcome the restriction of the extruder die to insure continuous pumping to the extruder die.

F. Die Restriction

The die 23 must be designed to generate adequate back pressure to control flashing/cooling in post reaction zone and to minimize surging. It also is used to allow controlled foaming of the extrudate due to flashing of water to steam.

Control of the foaming is very important to the product. Too much foaming and the product bulk density is low resulting in extra shipping expenses. If there is inadequate foaming, it is difficult to rapidly cool and dry the product quickly, and the hard granules that are formed are difficult to disperse in water for the end application.

Thus, some advantageous process details for the extruder die include, without limitation: (i) the use of back pressure to control flashing/cooling in the post reaction zone and to minimize surging, and (ii) good surface area generation by foaming extrudate noodles, effective cooling and drying by flashing steam, and improved "dispersability" in water because of foaming.

Process Control

Starch is a bio-based feedstock and can vary from lot to lot. Process control is necessary to manipulate the viscosity of the biopolymer nanoparticles product in a dispersion for a consistent product. It is also desirable to produce different viscosity products for various applications. It has been discovered that the quantity of water added to the extruder can be used for such purposes. In the process of the invention, water is injected in two locations: (1) upstream, before gelatinization; and (2) downstream, after the cross-linking reaction is complete.

A. Upstream Water and Viscosity Mechanism

The first water injection is used as the primary viscosity control agent. The principal mechanism that affects the dispersion viscosity is degradation of the starch in the process of producing the biopolymer nanoparticles. This can be due to mechanical/shear forces and/or due to thermal degradation of the starch. Evidence from numerous studies indicates that the thermal effects are more significant. In scale up evaluations without post reaction conditioning, an excellent correlation was found between the temperature of the extrudate and the dispersion viscosity. In subsequent evaluations on a ZSK-25 mm bench scale twin screw extruder where surface area and heat transfer can be used to allow very high specific mechanical energy (SME) and therefore shear inputs to the product independent of the paste temperature, the controlling factor was temperature, not shear. In other words, higher barrel temperatures caused lower SMEs and higher in-process temperatures resulted in lower dispersion viscosities.

B. Downstream Water

The second (downstream) water is used predominantly to control the handling characteristics of the product in the die 23 and in the post extruder handling/packaging system 70 by cooling, increasing the moisture content and reducing the foaming of the extrudate. Downstream water has a slight effect on the viscosity; however, it is much less than that of the upstream water and can be compensated for by minor adjustments of the upstream quantity.

Thus, some advantageous process details to improve dispersion viscosity include, without limitation: (i) increasing upstream water to decrease the product viscosity in a dispersion (and vice versa) because water is a plasticizer in the extruder and is used to control the amount of work input by the screws, and after the extruder, the water evaporates and therefore its plasticizing effects are in the extruder only, (ii) increasing downstream water for less blowing and surging at the extruder die, a more rubbery/less friable noodle, and higher product moisture content (and vice versa), (iii) recognizing that downstream water has much less of an effect on the viscosity than upstream water and therefore when changing downstream water, a much smaller, opposite change in upstream water should be made to maintain the viscosity, (iv) increasing screw speed to decrease the product viscosity in a dispersion (and vice versa), and (v) increasing barrel temperature to decrease the product viscosity in a dispersion (and vice versa).

EXAMPLES

The following examples serve to illustrate the invention and are not intended to limit the invention in any way.

Specific feed and run conditions are listed in Table A and Table B.

Examples 1 and 2

Examples 1 and 2 represent the initial scale up from a ZSK-58 extruder to a ZSK-92 twin screw extruder. See Screw #58-1 and 92-1 in FIG. 3. One extra barrel of solids conveying was used on the 92 mm extruder because an eight barrel configuration was not available. Because Screw #58-1 of FIG. 3 was deemed too strong (meaning this screw design put too much energy into the product), three left hand kneading blocks were removed from the gelatinization zone and one from the reaction zone for Screw #92-1 of FIG. 3. Also, an extra water injection was added along with the glyoxal (crosslinker) solution to allow evaluation of the effects of its concentration. As received, the glyoxal solution is 40% active in water. At two parts of glyoxal, this is equivalent to a base or minimum of 3 parts of water with it if no additional water is used. (See Table A.)

On startup, a preliminary gelatinization experiment without a die was run at 726 kg/hr and 300 rpm for a specific rate of 2.42 kg/hr/rpm without flooding the feed. This compares to a specific rate equivalent of 1.26 kg/hr/rpm for the ZSK-58 extruder realized at 92 mm. The reason for being able to operate with a higher flight fillage is the fact that the starch was preconditioned in Example 2 by mixing it with the glycerol off-line in a ribbon blender: thus improving its feeding characteristics. Based on subsequent results with this screw, such a high specific rate is not sustainable because of buildup filling in the undercut, thus decreasing both the volume and conveying efficiency of the two-diameter undercut elements (SKs). For comparison of the ZSK-58 extruder to the ZSK-92 extruder, a 3.99:1 volumetric scale up factor is used. Therefore, a specific rate of 0.316 on the ZSK-58 extruder in Example 1 would be equivalent to 1.26 on the ZSK-92 extruder.

Screw #92-1 of FIG. 3 was operated at a flight fillage factor of 1.34 to 1.40 kg/hr/rpm and a slightly lower screw speed than Screw #58-1 of FIG. 3. There was no steam back-venting on the ZSK-58 extruder; however, with Screw #92-1 of FIG. 3, it would shut the line down after only about 15 minutes of continuous operation.

Example 3

Example 3 is similar to Example 2 but represents a reduction in the quantity of water added downstream with the glyoxal (crosslinker) to determine the effect on the product viscosity. The extra water was reduced from 3.0 to 2.1 parts. The screw speed for Example 3 was 5% higher than that for Example 2. There was not a significant effect on the end product viscosity (measured as a standard 25% solids aqueous dispersion at 25° C. and 100 rpm on a Brookfield viscometer). More notably, viscosity was slightly higher even though the SME was about 10% higher in Example 3 due to the water and extruder rpm differences. In previous work, higher shear rates have resulted in lower dispersion viscosities. This is contrary to that and demonstrates that there are other controlling factors that affect viscosity. As with Example 2, steam back venting shut the line down after a short time.

Example 4

Example 4 was run on Screw #92-2 of FIG. 3. The differences with this screw vs. 92-1 of FIG. 3 were the replacement of the 2D pitch SK (undercut elements) in the feed zone with 1.5D normal elements; the replacement of a neutral kneading block with a left kneading block near the end of Barrel 6; the replacement of the left hand restriction in Barrel 7 with lower shear distributive mixing; a modification of the distributive mixing for the glyoxal (crosslinker) addition; and an adjustment of the mixing in the reaction zone.

The change in Barrel 6 was an attempt to help keep the steam from back venting. The SKs were replaced because the undercuts were filling up with hard starch effectively making them normal 2D conveying elements. The modifications in the glyoxal mixing and reaction mixing were because it was found that the unwiped slots in the slotted mixing element were filling up with starch and rendered ineffective. They were replaced with narrow disk forwarding kneading blocks.

In the initial run with this screw in Example 4, the flood feeding limit was determined to be 1.35 kg/hr/rpm. When compared with Example 2 which was run with the same formulation and a higher screw speed but equivalent specific rate, the resultant SME was higher and the dispersion viscosity was lower as a result of the extra mixing.

Example 5

Example 5 was run on Screw 92-2 of FIG. 3 at a higher screw speed vs. Example 4 to move away from the point of impending feed flooding. The result was an increase in the SME and a reduction in the standard 25% solids dispersion viscosity. The line was operated at these conditions for 40 minutes before it was shut down due to steam back venting.

Example 6

Example 6 was run on Screw 92-3 of FIG. 3. This screw had left hand conveying elements replacing the first two left hand kneading blocks in Screw 92-2 of FIG. 3. This was an attempt to achieve a more effective steam seal. The seal was too strong, forcing the steam backwards from the first kneading section resulting in plugging of the feed section. The line could not be operated long enough to line out and obtain a representative sample.

All subsequent examples (Examples 7-10) were run on Screw 92-6 of FIG. 3.

Examples 7 and 8

Examples 7 and 8 are process control examples. Screw 92-6 had a balanced and effective steam seal in the gelatinization zone and had the addition of a post reaction seal followed by a conditioning zone to control the product behavior at the die independently of the reaction. Also, to eliminate the need for off-line preblending, it used single flight feed elements and glycerol addition to the center of the feed opening just above the screws.

All work on this configuration has been consistently run at specific rates of ~2 kg/hr/rpm; representing a major improvement over the previous screw designs. When compared with Example 5, the rate at a given screw speed is virtually doubled. This is because of the combined effect of glycerol injection point and the single flight elements.

The differences between Examples 7 and 8 are the quantities of water injected before gelatinization and in the post reaction zone. This was done to produce two different dispersion viscosity products, Example 7 at 125 mPa·s and Example 8 at 200 mPa·s. The higher viscosity was made by increasing the upstream water from 0.8 to 11.4 parts. At the higher upstream water loading in Example 8, the post reaction water was not needed to control the discharge.

Success on the 92-6 screw was based upon the design changes, and in addition to this, the addition of single flight elements to allow for glycerol addition in the feed zone.

Example 9

The effect of operating at higher rates with proportionally higher screw speeds for a constant specific rate is demonstrated in Example 9 vs. Example 8. The rate was almost doubled to 1.1 metric tons per hour with no changes other than the screw speed. The product dispersion viscosity was slightly lower which can be compensated for by a slight decrease in the water loading. Based on extrapolation of this data, 733 rpm would be necessary for 1.5 metric tons per hour. The Mega compounder that has been used in this work can be run at that speed.

Example 10

Example 10 demonstrates the starch feed uptake improvement by addition of glycerol (plasticizer) to the center of the barrel feed opening just above the screws. The extruder was lined out at the same conditions as with Example 7 and then the glycerol was turned off. Flooding of the feed occurred almost immediately and a representative sample was not obtained. The difference in rates for Examples 7 and 10 is the glycerol.

This effect was replicated in some independent work on a ZSK-58 extruder using a screw that is geometrically similar to Screw #92-6 of FIG. 3. Flooding was almost immediate when the glycerol to the feed opening was stopped. However, when water was added to the feed opening in place of the glycerol, the rates were sustainable.

The data for Examples 1-10 is shown in Tables A and B below. With respect to the barrel temperature profiles presented in Table B, higher temperatures were used in Example 1 on the 58 in order to run more of an adiabatic system for better scalability. In Example 6 with Screw 92-3, a lower set point was used for Barrel 5 in an attempt to have an effect on the steam seal. With Screw 92-6, Examples 7-10, the last two barrels for the post reaction conditioning zone were cooler to aid in the process.

TABLE A

| Example No. | 1 | 2 | 3 | 4 | 5 | 6 | 7 | 8 | 9 | 10 |
|---|---|---|---|---|---|---|---|---|---|---|
| Screw Used (See FIG. 3) | 58-1 | 92-1 | 92-1 | 92-2 | 92-2 | 92-3 | 92-6 | 92-6 | 92-6 | 92-6 |
| Formulation (Parts per 100 Dry Starch) | | | | | | | | | | |
| Glycerol | 10.0 | 10.0 | 10.0 | 10.0 | 10.0 | 10.0 | 10.7 | 9.9 | 9.6 | None |
| Glyoxal | 2.0 | 2.0 | 2.0 | 1.9 | 1.9 | 1.9 | 2.0 | 2.0 | 2.0 | 2.0 |
| Upstream Water | 0.0 | 1.1 | 1.0 | 1.2 | 1.2 | 1.2 | 0.8 | 11.4 | 11.8 | 0.8 |
| Water with Glyoxal | 3.0 | 6.0 | 5.1 | 6.1 | 6.3 | 6.3 | 3.1 | 3.1 | 3.0 | 3.1 |
| Post Reaction Water | NA | NA | NA | NA | NA | NA | 9.0 | 0.0 | 0.0 | 9.0 |
| Glycerol Addition | Brl 2 | Pre-Blend | Pre-Blend | Pre-Blend | Pre-Blend | Pre-Blend | Brl 1 | Brl 1 | Brl 1 | None |
| Rate (kg/hr) Active Feed | 178 | 698 | 698 | 410 | 410 | 410 | 617 | 617 | 1117 | 562 |
| Extruder rpm | 564 | 500 | 523 | 303 | 398 | 398 | 310 | 303 | 543 | 303 |
| Specific Rate ((kg/hr)/rpm) | 0.316 | 1.40 | 1.34 | 1.35 | 1.03 | 1.03 | 1.99 | 2.04 | 2.06 | 1.85 |
| SME (J/g) | 1172 | 794 | 886 | 846 | 1040 | 1075 | 1053 | 944 | 863 | NA |
| Run Time re Steam | No Limit | ~15 mins. | 22 mins. | Flooded | 40 mins. | 15 mins. | No Limit | No Limit | No Limit | Flooded |
| Dispersion Viscosity [mPa · s] | 125 | 147 | 156 | 113 | 101 | No Sample | 123 | 200 | 176 | No Sample |

TABLE B

Barrel Temperature Profiles

| Example No. | 1 | 2 | 3 | 4 | 5 | 6 | 7 | 8 | 9 | 10 |
|---|---|---|---|---|---|---|---|---|---|---|
| Screw Used (See FIG. 3) | 58-1 | 92-1 | 92-1 | 92-2 | 92-2 | 92-3 | 92-6 | 92-6 | 92-6 | 92-6 |
| Temperature Set Points (° C.) | | | | | | | | | | |
| Barrel 1 | | | | ← Full Cooling → | | | | | | |
| Barrel 2 | 50 | 10 | 10 | 10 | 10 | 10 | 10 | 10 | 10 | 10 |
| Barrel 3 | 120 | 10 | 10 | 10 | 10 | 10 | 10 | 10 | 10 | 10 |
| Barrel 4 | 120 | 71 | 71 | 49 | 49 | 49 | 49 | 49 | 49 | 49 |
| Barrel 5 | 140 | 121 | 121 | 121 | 121 | 49 | 121 | 121 | 121 | 121 |
| Barrel 6 | 180 | 121 | 121 | 121 | 121 | 121 | 121 | 121 | 121 | 121 |
| Barrel 7 | 180 | 121 | 121 | 121 | 121 | 121 | 121 | 121 | 121 | 121 |
| Barrel 8 | 180 | 121 | 121 | 121 | 121 | 121 | 121 | 121 | 121 | 121 |
| Barrel 9 | | 160 | 160 | 160 | 160 | 160 | 121 | 121 | 121 | 121 |
| Barrel 10 | | | | | | | 93 | 93 | 93 | 93 |
| Barrel 11 | | | | | | | 93 | 93 | 93 | 93 |
| Die | 180 | 124 | 124 | 149 | 149 | 149 | 149 | 149 | 149 | 149 |

Therefore, it can be seen that the invention provides an improved process for producing biopolymer nanoparticles.

Although the invention has been described in considerable detail with reference to certain embodiments, one skilled in the art will appreciate that the present invention can be practiced by other than the described embodiments, which have been presented for purposes of illustration and not of limitation. For example, it is possible to achieve the same unit operation described herein with different element configurations and different brands and models of twin screw extruders. Therefore, the scope of the appended claims should not be limited to the description of the embodiments contained herein.

What is claimed is:

1. A process for producing a biopolymer product, the process comprising:

feeding biopolymer feedstock and a plasticizer to a feed zone of an
extruder having a screw configuration such that the biopolymer feedstock is processed using shear forces in the extruder;
wherein the screw configuration includes two or more steam seal sections to prevent water from flashing to steam and back venting to the feed zone, and wherein each of the two or more steam seal sections has an upstream pressure generating section and an adjacent downstream reverse kneading block, the upstream pressure generating section providing enough forward pumping action to overcome a seal formed by the adjacent downstream reverse kneading block; and
increasing the pressure in the extruder faster than the vapor pressure of water
increases due to increasing temperature in the reverse kneading blocks.

2. The process of claim 1 wherein:
each upstream pressure generating section has a forward kneading block.
3. The process of claim 1 wherein the plasticizer comprises water.

* * * * *